ates Patent [19]

Waugh

[11] Patent Number: 4,552,322
[45] Date of Patent: Nov. 12, 1985

[54] CASSETTE APPARATUS FOR STORING LIGHT SENSITIVE, HEAT DEVELOPABLE FILM

[75] Inventor: John B. S. Waugh, Mountain Lakes, N.J.

[73] Assignee: LASERstore, Ltd., Hamilton, Bermuda

[21] Appl. No.: 638,227

[22] Filed: Aug. 6, 1984

[51] Int. Cl.[4] .................... G03B 1/04; G11B 15/32
[52] U.S. Cl. .................................... 242/198; 352/72
[58] Field of Search ............ 242/71, 71.1, 71.7, 242/197–200; 352/72, 73, 75, 76, 78 R; 360/132, 137

[56] References Cited

U.S. PATENT DOCUMENTS

| D. 195,909 | 8/1963 | Martinez et al. | D61/1 |
| D. 199,649 | 11/1964 | Froehlich | D61/1 |
| D. 208,216 | 8/1967 | David et al. | D14/114 |
| D. 210,172 | 2/1968 | Roman | D61/1 |
| D. 231,993 | 7/1974 | Hosono et al. | D14/10 |
| D. 244,943 | 7/1977 | Balmer, Jr. | D14/10 |
| 1,954,328 | 4/1934 | Saver | 352/75 |
| 3,249,033 | 5/1966 | Cobb, Jr. et al. | 430/496 |
| 3,401,899 | 9/1968 | Goldberg | 242/198 |
| 3,467,339 | 9/1969 | Bradt | 242/197 |
| 3,526,884 | 9/1970 | Buslik et al. | 340/174.1 |
| 3,535,684 | 10/1970 | Raymond | 365/112 |
| 3,631,415 | 12/1971 | Asgard et al. | 340/174 YC |
| 3,655,256 | 4/1972 | Claytor et al. | 350/3.5 |
| 3,865,238 | 2/1975 | Colaluca | 206/404 |
| 3,887,787 | 6/1975 | Gregg | 219/216 |
| 3,934,270 | 1/1976 | Iwata | 360/96 |
| 3,939,975 | 2/1976 | Thevenaz | 206/387 |
| 4,021,006 | 5/1977 | Morimoto et al. | 242/199 |
| 4,033,523 | 7/1977 | Roman | 242/198 |
| 4,076,532 | 2/1978 | Gottermeier | 428/913 X |
| 4,116,559 | 9/1978 | Morokuma et al. | 355/28 |
| 4,136,839 | 1/1979 | Walter | 242/71.1 |
| 4,346,880 | 8/1982 | Roller et al. | 271/186 |
| 4,422,550 | 12/1983 | Okamura | 206/387 |
| 4,457,473 | 7/1984 | Mroz et al. | 242/192 |

Primary Examiner—Leonard D. Christian
Attorney, Agent, or Firm—Richard C. Woodbridge

[57] ABSTRACT

A light sensitive, heat developable film is stored in a cassette which includes a sliding film carrier bracket for transporting the film into and out of the cassette housing. Each cassette housing encloses a supply spool, a take-up spool, the light sensitive film, the film carrier bracket mechanism and a drive means for propelling the film carrier bracket in and out of the cassette housing. A door is slidably attached to the front of the housing to shield the film from ambient light when the cassette is not in use. When the cassette is placed into a recording machine the supply and take-up spools are engaged by motors capable of driving the spools forward or backward. At the beginning of operation an internal drive motor propels the film carrier bracket into contact with the inside of the door which releases an internal door lock. An external lead screw then withdraws the door upwardly. After the door is fully open the film carrier bracket is advanced out of the housing bringing the film into contact with the read/write and development elements internal to the recording machine. When the recording or playback operation is over, the internal drive motor returns the film and the carrier bracket to the inside of the housing after which the door is closed. The cassette is especially useful in the context of light sensitive, heat developable film which is capable of storing high density data supplied by a holographic scanning mechanism.

19 Claims, 13 Drawing Figures

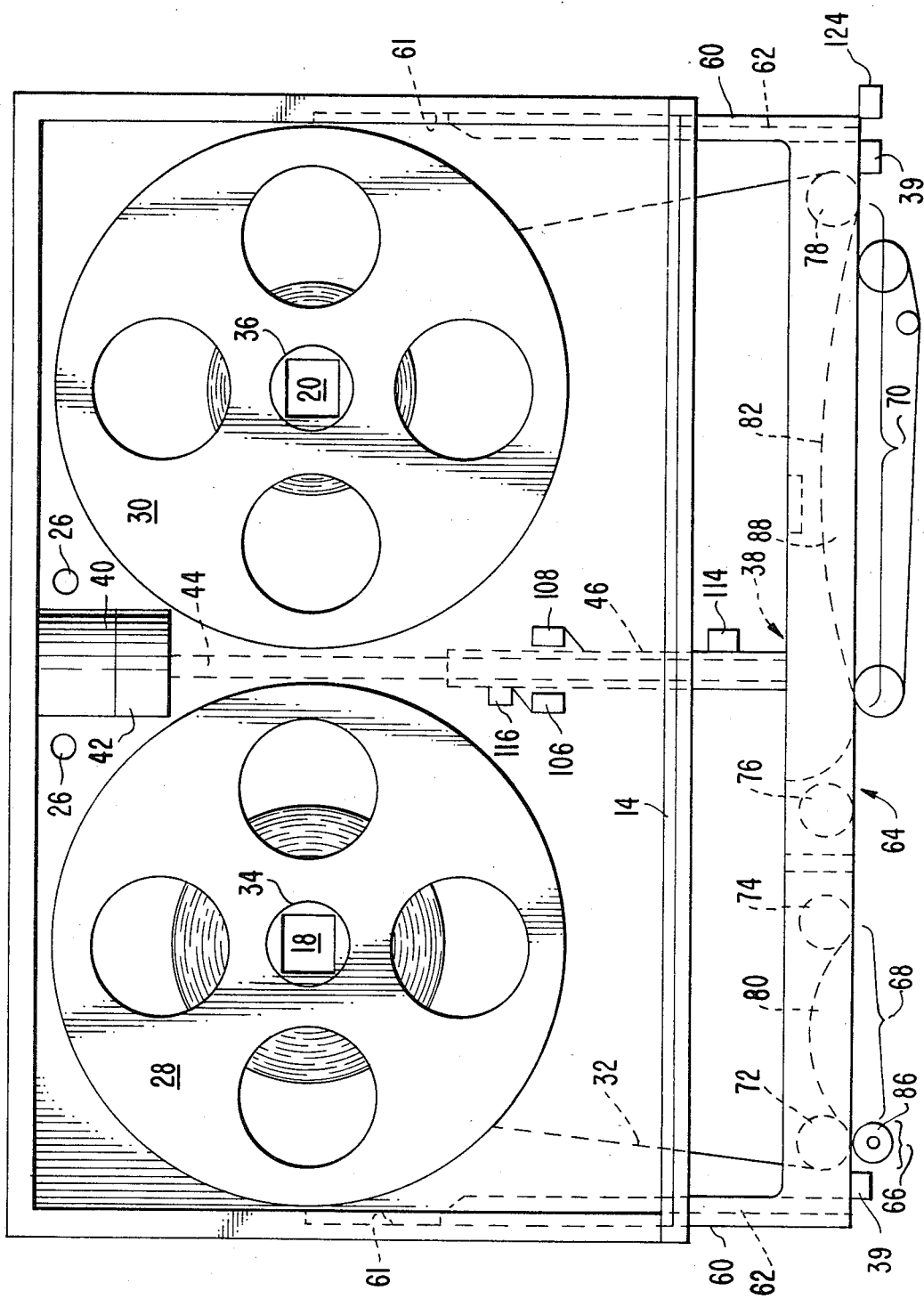

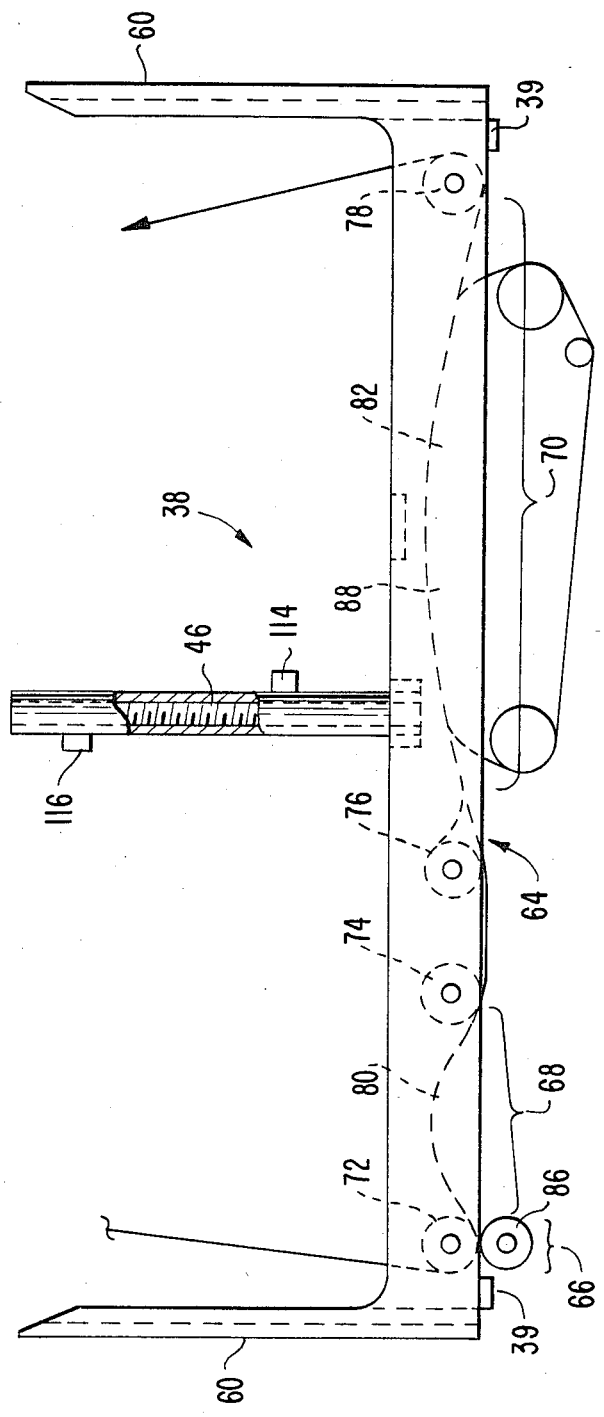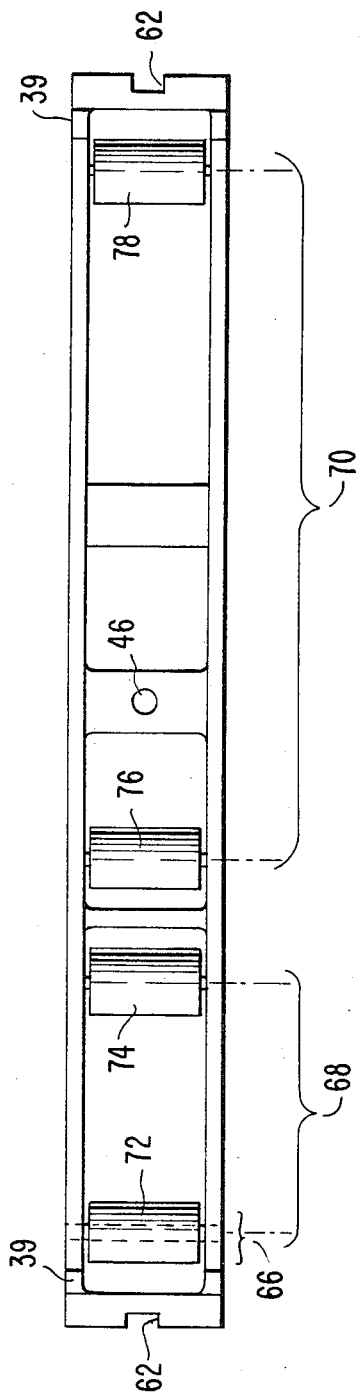

CASSETTE APPARATUS FOR STORING LIGHT SENSITIVE, HEAT DEVELOPABLE FILM

BACKGROUND OF THE INVENTION

1. Field of the Invention

This invention relates to a film cassette for storing light sensitive, heat developable film.

2. Description of the Prior Art

The use of light sensitive, heat developable film is known in the prior art even though it does not have a wide spectrum of application. Dry silver film of that nature is available from the Minnesota Mining and Manufacturing Company. It is normally supplied in wide widths on relatively large reels.

The patent literature discloses some applications of heat developable film in the contact of laser scanners. See, the example, U.S. Pat. No. 3,631,415. U.S. Pat. No. 3,535,684 discloses a heat developable film strip used in the context of a non-holographic, flying spot scanner. Similarly, U.S. Pat. No. 3,887,787 discloses the use of a scanner beam with a film strip in the context of a heater/ developer system. U.S. Pat. No. 4,116,559 is of special interest in that it discusses a variety of prior art heater structures for use with heat developable film. The following U.S. Patents are also of interest, though of less direct relevance: U.S. Pat. Nos. 3,655,256; 4,076,536 and 4,346,880.

One of the more important features of the present invention is the ability to manipulate a latch, or a lid associated with a film cassette. U.S. Pat. No. 4,033,523 is relevant in that it discloses a cassette having a cover including a latch mechanism which automatically disengages once the cassette is placed into the camera. U.S. Pat. No. 3,865,238 appears to have similar structure and was cited in the prosecution of U.S. Pat. No. 4,033,523. Less relevant, but also cited in the prosecution of U.S. Pat. No. 4,033,523 was U.S. Pat. No. 3,401,899. U.S. Pat. No. 4,116,559, previously discussed, is of possible relevance in that it discloses the combination of a film package with a heater element. Also, U.S. Pat. No. 3,249,033 is of note in that it discloses the use of a cassette in the context of a light fixed medium.

The prior art also discloses cassette type structures of possible relevance. For example, U.S. Pat. No. 3,939,975 describes a structure which allows a film loop or the like to be pulled outside of a housing. U.S. Pat. No. 4,422,550 shows a housing having a pivot-up type of front door. Similar pivot-up front doors are known to be used with modern video cassette recorders. U.S. Pat. No. 4,021,006 describes a film cassette structure having a set of jaws that operate as doors. Of lesser note is U.S. Pat. No. 3,934,270 which discloses a system employing a pair of motors to drive the supply and take-up reels and in which the speed of the film is controlled by a separate capstan drive mechanism. Lastly, U.S. Pat. No. 4,457,473 discloses a mechanism in which the supply and take-up reel are driven by a belt that contacts the edge of both film reels. In addition to the foregoing there are a variety of mechanisms known in the video tape recording art for extracting a loop of film from a cassette housing so that it can come into contact with a read and/or write mechanism.

Other patents of interest, but less relevance, include: U.S. Pat. Des. 195,909; Des. 199-649; Des. 210,172; Des. 208,216 Des. 244,943; Des. 231,993; U.S. Pat. Nos. 3,526,884; 3,467,339; 4,136,839.

Insofar as understood, none of the prior art discloses a cassette for use with light sensitive, heat developable film in which a light tight door is operable to allow a film carrier to automatically extend beyond the housing of the cassette.

SUMMARY OF THE INVENTION

Briefly described the invention comprises a film cassette which includes a carrier bracket which can be automatically extended beyond the confines of the cassette housing. A light, tight, slidable door is located on the front edge of the cassette. Inside the cassette housing the following elements are found: A supply reel; a take-up reel; a length of light sensitive/heat developable film attached to the supply reel and the take-up reel; a slidable film carrier bracket; and, a drive motor mechanism for driving the film carrier bracket forward or backward. The front door includes two metal leaf spring elements which keep the door closed when the cassette is not being used.

Prior to operation the cassette is loaded into a recording device. The recording device, according to the preferred embodiment of the invention, includes a holographic laser scanning mechanism for placing information on the light sensitive/heat developable film. While a holographic scanning system is preferred there are other types of laser and non-laser scanning systems that might also work. A pair of external electrical contacts mounted on the cassette housing supply power to the internal drive mechanism. The internal drive mechanism causes the film carrier bracket to impinge upon the metal leaf springs causing them to disengage from their formerly locked position. A door opening lead screw then descends from above and engages a threaded passageway in the cassette door. As the lead screw rotates the door is drawn upward and away from the area where the film carrier bracket will travel. Further activation of the internal drive mechanism causes the film carrier bracket to advance outside of the cassette housing thereby bringing the film into contact with various recorder elements including a capstan drive roller, a platen to position the film in the read/write zone and a developer/heater mechanism. The upward movement of the door impinges upon a lever causing a pair of square drive shafts to enter the cassette housing and engage the center axles or hubs of the supply and take-up spools respectively. Drive motors associated with the square shafts cause the supply and take-up spools to rotate thereby either advancing or rewinding the light sensitive film. When the reading or writing operation is completed, the cylce is reversed. Specifically, the drive mechanism causes the film carrier bracket to withdraw into the cassette housing. Then the upper lead screw drives the door into its normally closed position at which point the spring-loaded metal leaf springs return to their original condition locking the front door with respect to the cassette housing. The downward motion of the front door also takes pressure off the lever which in turn withdraws the spool drive shafts from the supply and take-up spools. The cassette is now in condition to be removed from the recording device.

These and other features of the invention will be more fully understood by reference to the following detailed drawings.

BRIEF DESCRIPTION OF THE DRAWINGS

FIG. 4 is a top plan cross-sectional view of the preferred embodiment of the cassette with the film carrier bracket extending beyond the cassette housing and coming into contact with active elements of a recording device.

FIG. 5A is a top plan detail view of the film carrier bracket.

FIG. 5B is a front elevational view of the film carrier bracket illustrated in FIG. 5A.

DETAILED DESCRIPTION OF THE INVENTION

During the course of this description like numbers will be used to identify like elements according to the different views which illustrate the invention.

Figure 1:
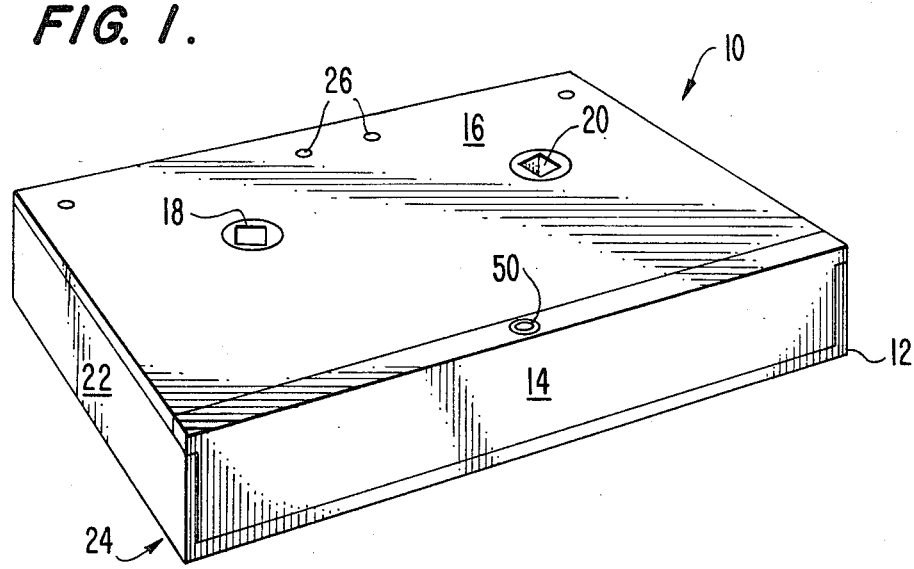
FIG. 1 is a front perspective view of the preferred embodiment of the film cassette.
Figure 3:
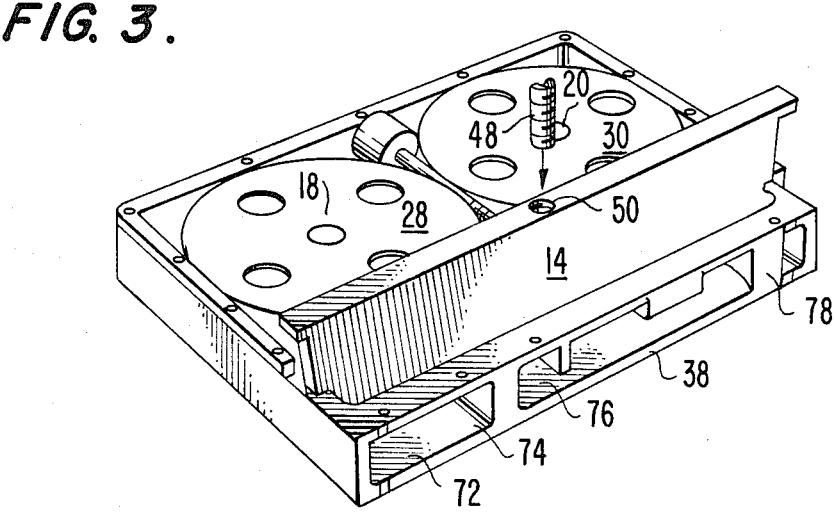
FIG. 3 is a front perspective view of the cassette shown in FIG. 1 with the front door open and the film carrier bracket extending outside of the cassette housing.
Figure 6A:
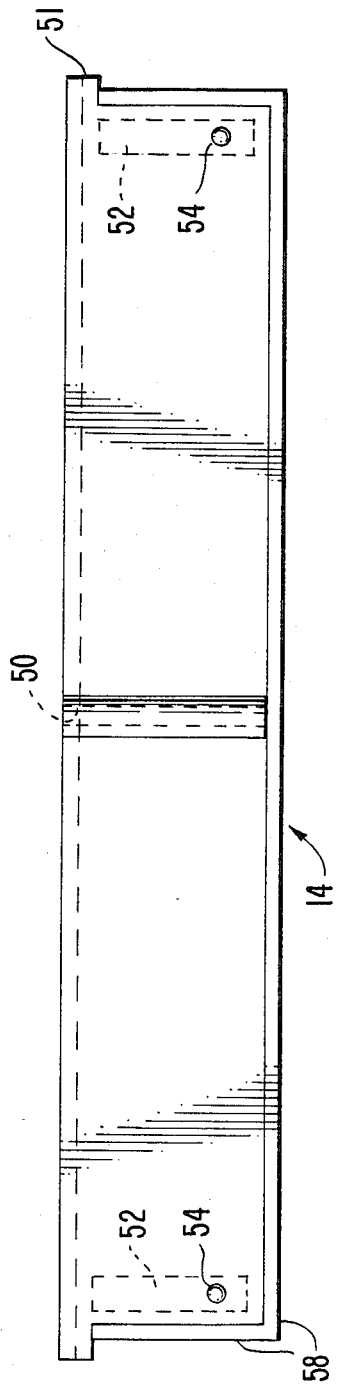
FIG. 6A is a front elevational view of the front door of the cassette.
Figure 6B:
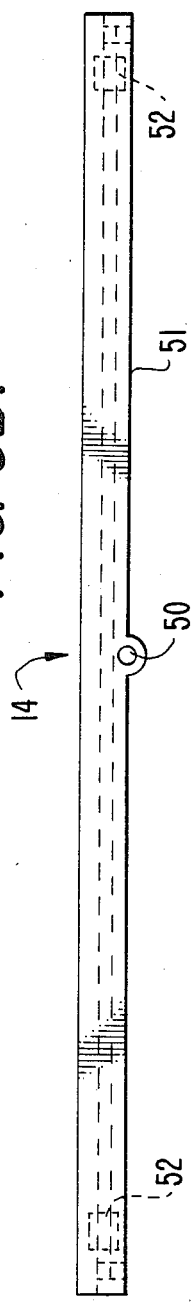
FIG. 6B is a top plan view of the front door shown in FIG. 6A.
Figure 6C:
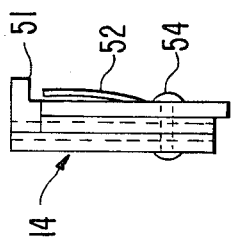
FIG. 6C is a side elevational view of the front door shown in FIGS. 6A and 6B.
Figure 7:
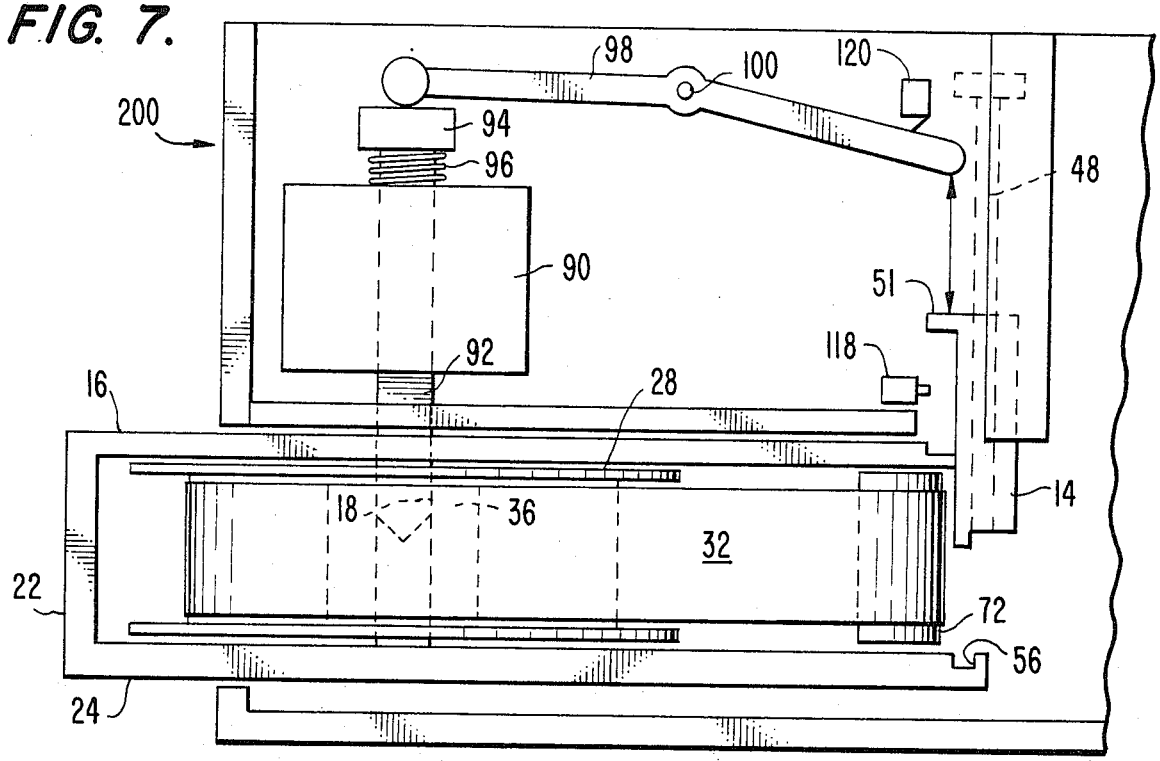
FIG. 7 illustrates the external drive mechanism for the supply and take-up spools.
Figure 8:
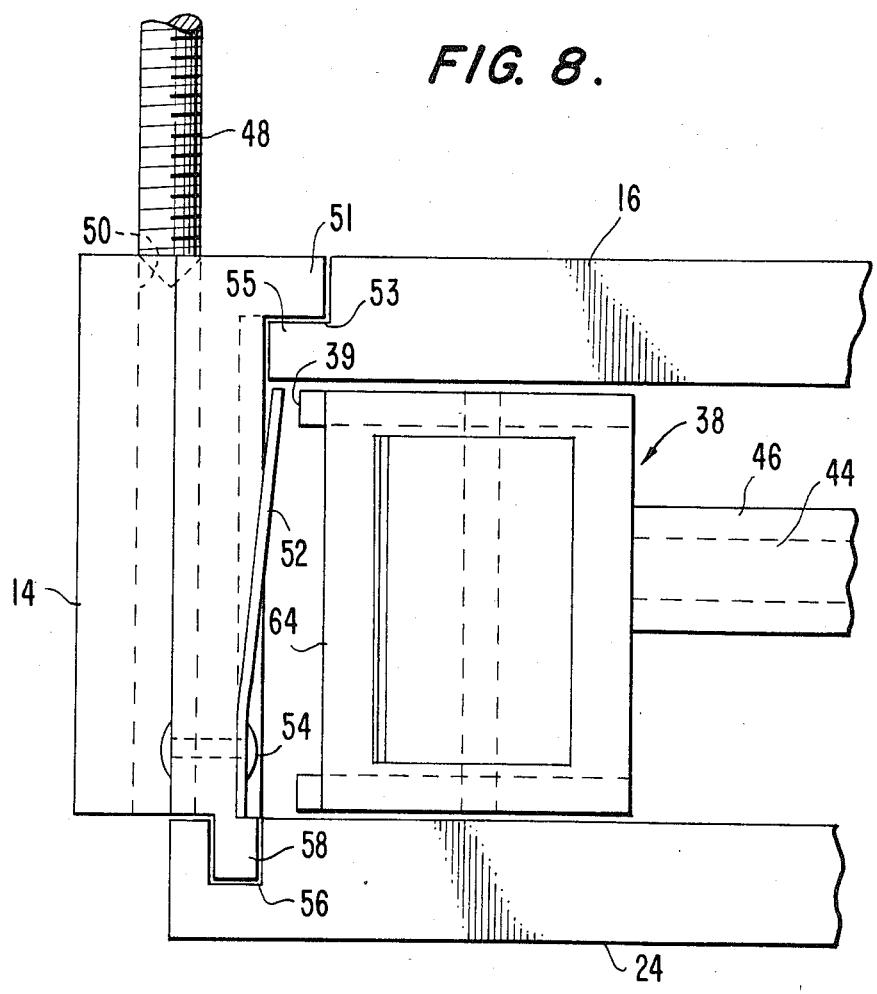
FIG. 8 illustrates the external drive mechanism for raising and lowering the front door.

As shown in FIG. 1, the preferred embodiment of the cassette invention 10 includes a housing 12 and a slidable, light tight front door 14. Cassette housing 12 includes a top panel 16, three side panels 22 and a bottom 24. Square hub apertures 18 and 20 are connected to internal supply spool 28 and take-up spool 30 respectively. Square hub apertures 18 and 20 are engagable with a square drive shaft 92 such as illustrated in FIG. 7. A pair of electric motor contact points 26 supply power to the film carrier bracket drive motor 40. Front door 14 is drivable upwards or downwards by means of a vertical door opening lead screw 48 such as shown in FIGS. 3 and 8. The door opening lead screw 48 engages with threaded aperture 50 in the top portion of door 14.

Figure 2:
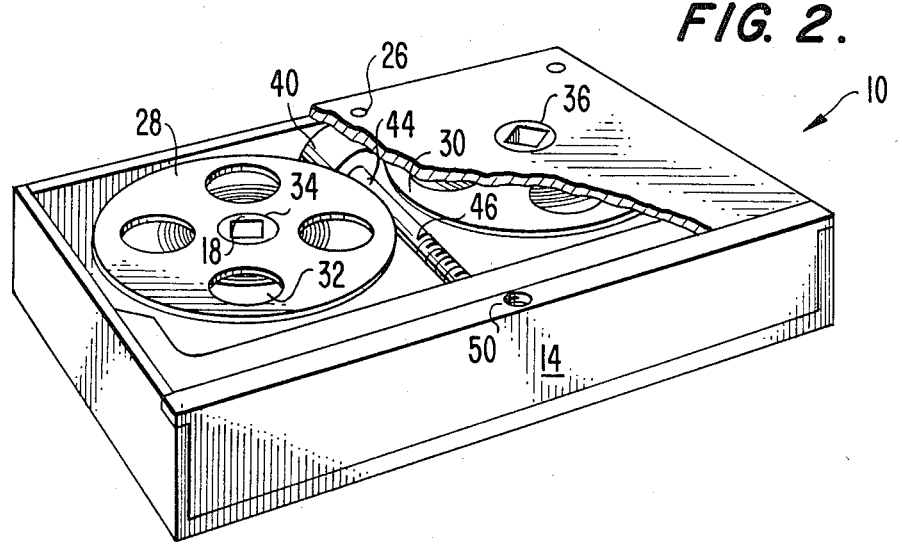
FIG. 2 is a front perspective view of the cassette shown in FIG. 1 with the top partially broken away to reveal the film supply and take-up spools.

FIG. 2 illustrates the cassette 10 with the top cover 16 partially broken away to reveal the film carrier bracket drive mechanism. Light sensitive, heat developable film 32 is transported from supply spool 28 to take-up spool 30 and vice versa. Acceptable dry silver light sensitive heat developable film is available from Minnesota Mining and Manufacturing Company, Inc. Supply spool 28 is supported by a hub bearing 34 having square aperture 18 in the middle thereof. Similarly, take-up spool 30 is supported by a hub bearing 36 having square aperture 20 in the middle thereof. Film 32 passes over a carrier bracket 38 as it is transported between supply spool 28 and take-up spool 30. Film carrier bracket 38 advances light sensitive film 32 outside of housing 12 when door 14 is opened. Power to move film carrier bracket 38 is provided by a drive mechanism including bi-directional motor 40, a gear reduction unit 42 attached to motor 40 and a lead screw 44 attached to the gear reduction unit 42. Motor 40 is a direct current, permanent magnet, bi-directional motor whose electrical power comes through contacts 26 in the top 16 of housing 12. Reversing the polarity of the electrical power applied to contacts 26 causes the motor 40 to reverse. Lead screw 44 is received in tubular element 46 attached to the film carrier bracket 38. Receiving tube 46 is threaded so as to receive the external threads on lead screw 44. As lead screw 44 rotates under the influence of motor 40, the receiving tube 46 and therefore the film carrier bracket 38 will move forward or backward.

Film carrier bracket 38 cannot move out of housing 12 unless door 14 is fully opened. FIG. 3 illustrates the preferred embodiment of the cassette 10 with the door 14 in the fully opened state. Other details of the door opening mechanism are found in FIG. 8. Front door 14 is opened by lead screw 48 which engages the threaded hole 50 in the top of door 14. However, door 14 cannot move unless and until it is internally unlocked. The internal locking of door 14 is accomplished by a pair of metal leaf springs 52 connected by rivet elements 54 to the inside of the door 14. The springy nature of metal leaf springs 52 is such that they normally extend into the interior of housing 12 far enough to interfere with the overhanging ledge 55 of the top panel 16 when an effort is made to move the door 14 upwardly. The leaf spring locks 52 can only be released by urging the film carrier bracket 38 forward so that leading edge portion 39 pushes the leaf spring 52 beyond the inner ledge 55 of the top cassette panel. Therefore, it is necessary to activate drive motor 40 in order to cause the leaf springs 52 to release the door 14 for upward travel.

The internal structure of the cassette 10 also includes a pair of limit switches 106 and 108 which interact respectively with a pair of lugs 116 and 114 mounted on lead screw receiving tube 46. The complete system includes a set of external limit switches 118 (FIG. 7), 120 (FIG. 7) and 124 (FIG. 4) which have roles in the opening and closing operation of the cassette. The function of switch elements 106, 108, 118, 120 and 124 is discussed later in detail with respect to FIGS. 9 and 10.

When the door 14 is in the locked mode as shown in FIG. 8, the bottom and side edges 58 are received in a sot 56 which extends down the inside of both sides 22 of housing 12 and across the inside of bottom panel 24. Side and bottom edge 58 when received in circumferential slot 56 provide for a positive light tight barrier that protects the film 32 on the inside of the cassette 10. The top edge of door 14 includes an overhanging lip 51 which is received in notch 53 in top cassettte panel 16. Because top lip 51. overlaps the bottom ledge 55 of the top panel 16, it provides an absolute, light tight seal. Therefore, the door 14 positively prevents the entrance of ambient light into the interior cavity of housing 12 when the door 14 is locked such that the metal leaf springs 52 are in the position shown in FIG. 8.

The unlocking of door 14 is accomplished by bringing the leading edge 39 of film carrier bracket 38 into contact with the top portion of both leaf springs 52 forcing them beyond the plane of ledge 55. Once door 14 is unlocked in the foregoing manner, lead screw 48 engages the threads in aperture 50 causing the door 14 to be withdrawn upward far enough for the film carrier bracket 38 to travel outside of housing 12. As door 14 reaches its upper, withdrawn limit, top edge 51 comes in contact with lever arm 98 which rotates around a fixed pivot point 100. The upward pressure of door 14 on lever arm 98 causes the other end of lever arm 98 to bear down on the head 94 of square drive shaft 92. Square drive shaft 92 then engages the square supply spool aperture 18 or the square take-up spool aperture 20. A return spring 96 normally urges the square drive shaft 92 out of the spool apertures 18 or 20 unless the lever 98 is exerting downward pressure on the head 94. Once the door 14 is fully opened and the square drive shafts 92 are engaged in square apertures 18 and 20, the spool drive motor 90 will cause the spools to rotate thereby driving film 32 across the face of the film carrier bracket 38. According to the preferred embodiment, two sets of spool drive mechanisms such as shown in FIG. 7 are employed to drive the supply spool 28 and take-up spool 30 respectively. Therefore, it is clear that the vertical door opening lead screw 48 not only opens the front door 14 but, in addition to that, it causes the square drive shafts 92 to engage the square apertures 18 and 20 of the spools 28 and 30 respectively.

Once the door 14 is fully opened and the square drive shafts 92 are fully engaged, then it is possible for the film carrier bracket to be advanced outside of housing 12. FIGS. 3 and 4 show the carrier bracket 38 completely extended to its limits outside of housing 12. The structure of the film carrier bracket 38 is illustrated in FIGS. 5A and 5B. The bracket 38 is supported by a pair of side arms 60 which each include a horizontal slot 62 to engage the pair of horizontal ribs 61 on the interior of housing 12. Therefore, the carrier bracket 38 slides in and out of housing 12 supported by ribs 61. The front face 64 of the carrier bracket 38 is divided into a capstan drive zone 66; a read/write zone 68; and a film development zone 70. Film 32 from supply spool 28 initially passes over first roller 72 on the left side of read/write zone 68, over a second roller 74 on the right side of read/write zone 68, over a third roller 76 on the left side of the development zone 70 and over a fourth roller 78 on the right side of development zone 70 and then back to take-up spool 30. Between first roller 72 and second roller 74 the film 32 passes behind a platen 80 which correctly positions the film for the focal length of the holographic scanning mechanism Platen 80 is a fixed, non-movable member which is highly polished and includes a hole in it for the scanning beam to pass through. The details of the scanning mechanism are not considered to be relevant to an understanding of this cassette invention. Other types of laser or non-laser scanning mechanisms may also work. Film 32 also passes in front of a support plate 82 located in the development zone 70. A capstan drive roller 86 drives the film 32 in the capstan drive zone 66. The film 32 is pinched between capstan drive roller 86 and roller 72. The purpose of capstan drive roller 86 is to control the linear speed of the film in the read/write zone 68. While it might be possible to control the speed of the film 32 by means of spool drive motor 90, it has been found that a more precise and reliable speed control is obtained by using a capstan drive roller 86 in the manner described. As the film 32 travels towards the take-up spool 30 it passes between a heater head 88 and the film support plate 82. The user of heaters to develop light sensitive/- heat developable film is known and a description of the details of the heater head 88 is not required for an understanding of the cassette invention. A description of some of the prior art heating devices associated with heat developable film is found in the portion of this disclosure entitled "Description of the Prior Art".

Figure 9:
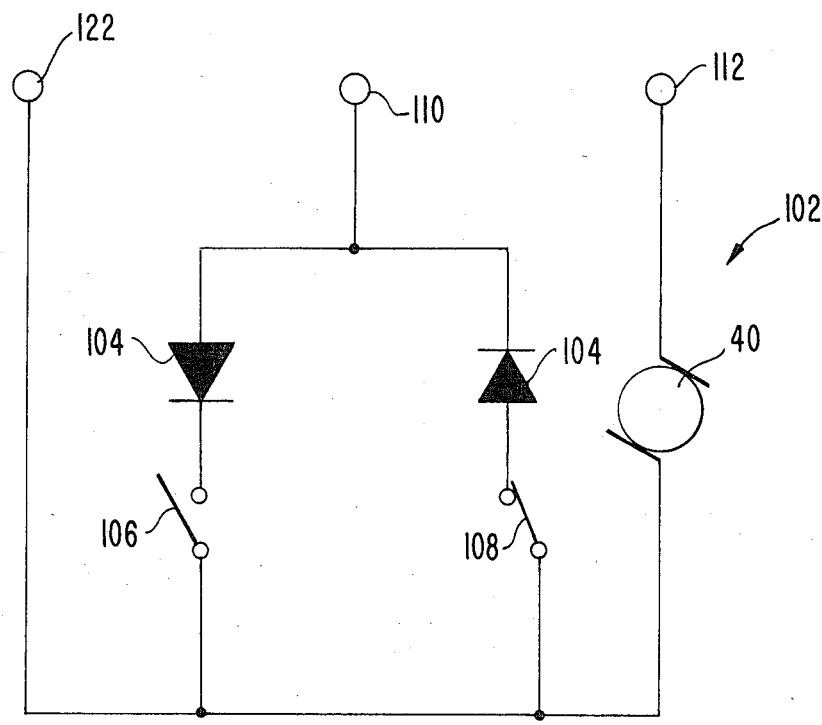
FIG. 9 is an electrical schematic of the circuit used to energize the film carrier bracket drive motor.
Figure 10:
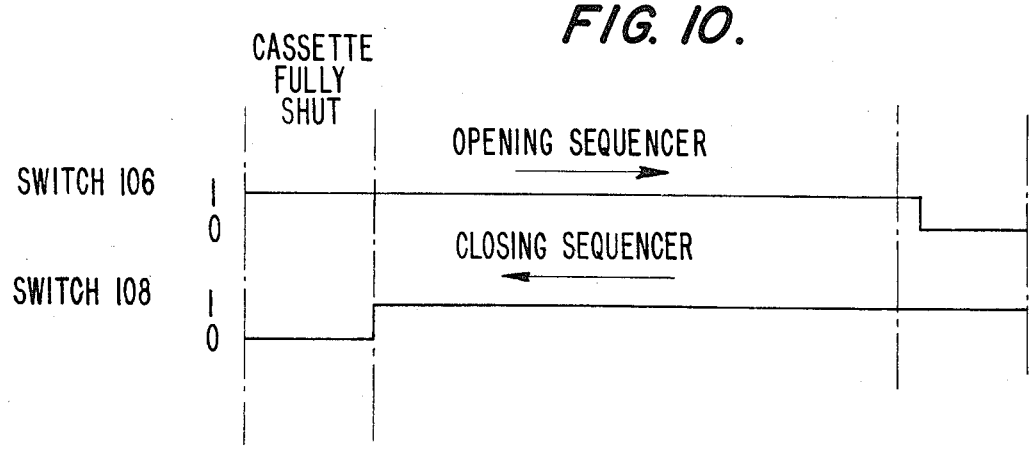
FIG. 10 is the switching wave form of the motor circuit of FIG. 9.

The electrical circuit 102 which controls permanent magnet motor 40 is illustrated in FIG. 9. The direction of rotation of motor 40 depends entirely upon the electrical D.C. potential applied across contacts 110, 112 and 122. A pair of diodes 104 are employed in two branches of the circuit. One branch is associated with switch 106. The other branch is associated with switch 108. When switch 108 is closed (as shown in FIG. 9) and a negative potential is applied to contact 110, a complete electrical circuit is formed and power flows in one direction through motor 40 causing it to rotate. Conversely, when switch 108 is opened and switch 106 is closed the potential on contact 110 is positive. An electrical circuit is then formed in which the current flows in the opposite direction causing the motor 40 to reverse its direction of rotation. By controlling switches 106 and 108 and the polarity of the potential across contacts 110, 112 and 122 it is possible to control the drive motor 40 which causes the carrier bracket 38 to move in and out of housing 12.

Second, contacts 26 provide positive power to the motor 40 through diode 104 and swich 106. Switch 106 is normally closed as shown in the first wave form of FIG. 10. Drive motor 40 causes the carrier transport bracket 38 to move forward until the leading edge portion 39 comes into contact with the metal locking springs 52. At that point, lug 116 comes into contact with switch 106 turning switch 106 off. This prevents the transport carrier 38 from applying force to the door 14 during the door opening phase. Third, the change of current to motor 40 is detected in a conventional manner and power is provided to the door opening lead screw 48 so that it makes contact with threaded aperture 50 in door 14 causing the door 14 to withdraw to its fully open position. As door 14 opens it first makes contact with limit switch 118 which makes sure that power is not provided to motor 40 during the door opening process. Fourth, the upward motion of door 14 causes the top edge 51 to come into contact with spool drive lever 98. The upward motion of one end of lever 98 causes the other end of lever 98 to drive the square drive shaft 92 into engagement with drive apertures 18 and 20 of supply spool 28 and take-up spool 30. The upward motion of door 14 also causes lever 98 to contact limit switch 120 which signals the system that the door 14 is fully opened so that the film transport bracket 38 can be further extended. Fifth, the closing of switch 120 causes power to be applied to contact 122 shown in FIG. 9 which reinitiates rotation of motor 40 causing the carrier transport bracket 38 to extend to its maximum travel position at which point capstan roller 86, platen positioning plate 80 and heater head 88 come into contact with film 32. The film 32 is then in position for reading, writing and development. Once the film 32 comes into contact with elements 80, 86 and 88, then the drive motors 90 controlled by an internal conventional microprocessor, or similar device, cause the film 32 to pass by the various different operation zones 66, 68 and 70. Sixth, the completion of the film extension step is detected by limit switch 124 which contacts the film transport carrier 38 when the film transport carrier is fully extended. This causes the power to be shut off to contact 122 which in turn causes motor 40 to cease rotation.

The film 32 is returned to cassette housing 12 by reversing the sequence. The steps are as follows. First negative power is applied to contact 110 causing current to flow through diode 104 and through motor 40. That causes motor 40 to rotate in the opposite direction causing the film transport bracket 38 and the film 32 to withdraw into the inside of housing 12. Second, the withdrawing of film transport carrier bracket 38 into the housing causes lug 114 to come into contact with switch 108 causing it to open as shown in the second wave form of FIG. 10. This shuts off power to motor 40. Third, the control circuitry senses the change of current supplied to motor 40 and applies power to the door opening lead screw 48 causing it to reverse direction so as to return door 114 to its normally closed position as shown in FIG. 8. Fourth, the natural spring action of leaf springs 52 cause them to return to their at rest position under ledge 55 thereby securely locking door 14 closed until such time as the opening sequence is reinitiated.

There may be some changes that can be made to the invention that might be useful. For example, it might be possible to replace the internal drive motor 40 with an external mechanism for grabbing the film carrier bracket 38 and withdrawing it from the housing. Also, it is possible that a door that rotates open on a hinge might be used in place of a sliding door 14. Also, it may be possible to use an endless belt mechanism on the inside of the cassette housing 12. This arrangement could be used in the context where only an exterior capstan drive is possible. While the preferred embodiment of the invention contemplates the use of a holographic scanning system it will be appreciated by those of ordinary skill in the art that certain types of non-holographic systems could also be employed.

While the invention has been described with reference to the preferred embodiment thereof it will be appreciated by those of ordinary skill in the art that modifications can be made to the structure and function of the apparatus without departing from the spirit and scope of the invention.

I claim:

1. A cassette apparatus comprising:
a housing;
a supply spool located in said housing;
a take-up spool located in said housing;
film means for storing information connected to said supply spool and said take-up spool;
film carrier means for withdrawing film from said housing and presenting it outside of said housing; and,
movable door means connected to said housing for preventing light from entering said housing when said door means is closed and for allowing said film carrier means to extend said film beyond said housing when said door means is open.

2. The apparatus of claim 1 further including:
locking means for locking said door means with respect to said housing.

3. The apparatus of claim 2 wherein said film carrier means includes a front face having at least three zones including:
a capstan drive zone;
a read/write zone; and,
a development zone.

4. The apparatus of claim 3 wherein said film carrier means comprises:
a movable film support means for moving in and out of said housing; and,
a drive means located in said housing for driving said film support means in and out of said housing.

5. The apparatus of claim 4 wherein said drive means comprises:
a motor means;
a threaded lead screw connected to said motor means; and,
a thred member attached to said film support means for receiving said threaded lead screw.

6. The apparatus of claim 5 wherein said locking means comprises:
a spring means attached to said door means for normally engaging said housing when said spring means is relaxed.

7. The apparatus of claim 6 wherein said read/write zone includes at least:
a first roller means for supporting said film as it travels; and,
a second roller means for supporting said film as it travels.

8. The apparatus of claim 7 wherein said housing includes a groove means for engaging the edges of said door means so that said door means is capable of sliding up and down in said housing.

9. The apparatus of claim 8 wherein said housing includes a rib means for engaging said film support means so that said film support means can slide into and out of said housing.

10. The apparatus of claim 9 wherein said film comprises a light sensitive, heat developable film.

11. A cassette apparatus comprising:
a housing;
a supply spool located in said housing;
a take-up spool located in said housing;
film means for storing information connected to said supply spool and to said take-up spool;
film carrier means for supporting a portion of said film means;
movable door means connected to said housing for preventing light from entering said housing when said door means is closed; and,
motor means located in said housing for propelling said film carrier means and a portion of said film means outside of said housing when said door means is open.

12. The apparatus of claim 11 further including:
locking means for locking said door means with respect to said housing.

13. The apparatus of claim 12 wherein said locking means comprises a spring means attached to the inside of said door means,
wherein said locking means is unlocked by said film carrier means when said film carrier means comes in contact with said spring means when propelled by said motor means.

14. The apparatus of claim 13 wherein said motor means includes:
a reversable motor;
a threaded lead screw connected to said reversable motor; and,
a hollow threaded member attached to said film carrier means for receiving said threaded lead screw.

15. A cassette system comprising:
a housing;
a supply spool located in said housing;
a take-up spool located in said housing;
film means for storing information connected to said supply spool and to said take up spool;
movable door means connected to said housing for preventing light from entering said housing when said door means is closed;
film carrier means for supporting a portion of said film means;

motor means for propelling said film carrier means and a portion of said film means outside of said housing when said door means is open;

spool drive means; and, spool engaging means responsive to the movement of said door means for causing said spool drive means to drivingly engage said supply and take up spools.

16. The system of claim 15 further including:

a locking means for locking said door means with respect to said housing; and, an unlocking means for unlocking said locking means.

17. The apparatus of claim 16 wherein said unlocking means includes said film carrier means.

18. A method for advancing film stored in a cassette including a housing, a supply spool located in said housing, a take up spool located in said housing, film connected between said supply spool and said take up spool, a door means connected to said housing, a film carrier means for supporting a portion of said film; a motor means for propelling said film carrier means and a portion of said film outside of said housing, and, a locking means for locking said door means with respect to said housing, said method comprising the steps of:

providing electrical energy to said motor means causing said film carrier means to contact said locking means thereby unlocking said locking means;

opening said door means; and, propelling said film carrier means and a portion of said film outside of said housing by said motor means.

19. The method of claim 18 further including the step of:

operating a lever means in response to the opening of said door means to engage said supply and take up spools with a spool drive means.

* * * * *